Dec. 5, 1933.  W. E. SPERRY  1,938,157
BICYCLE TRANSMISSION
Filed July 14, 1932
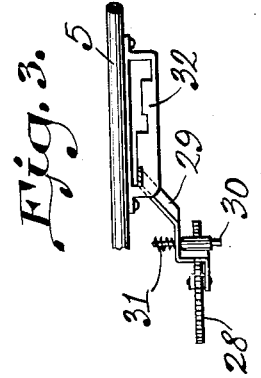
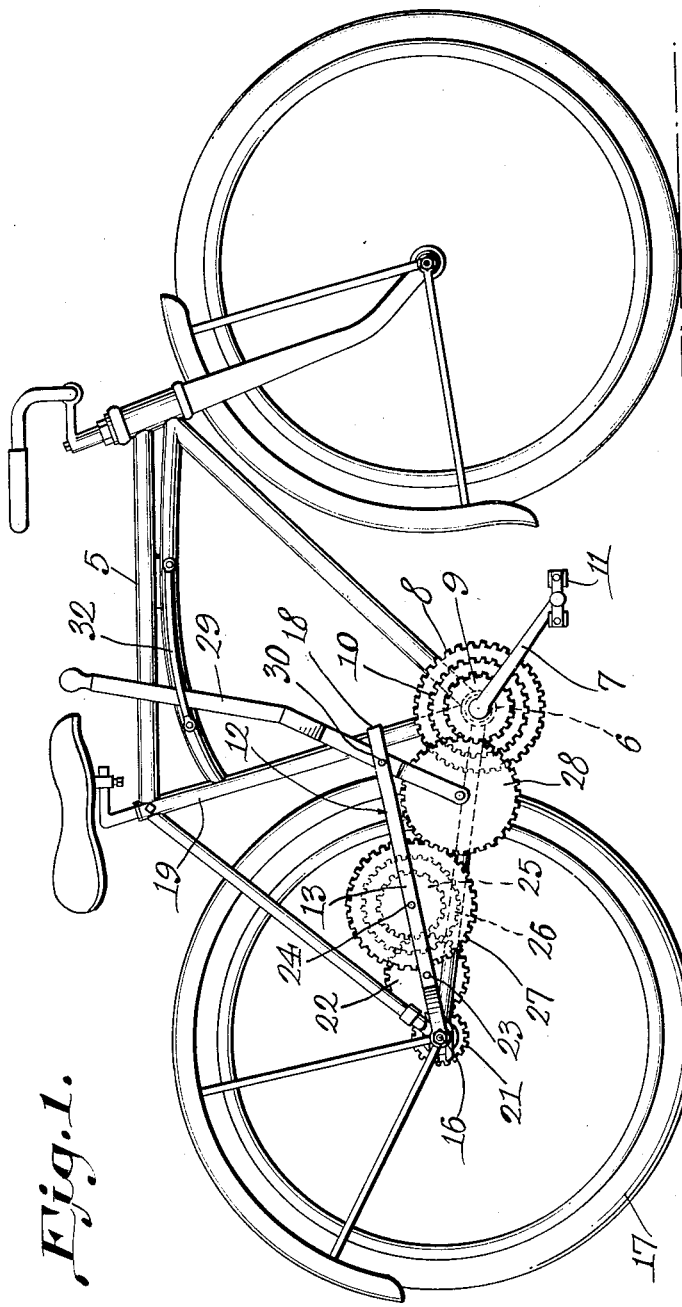
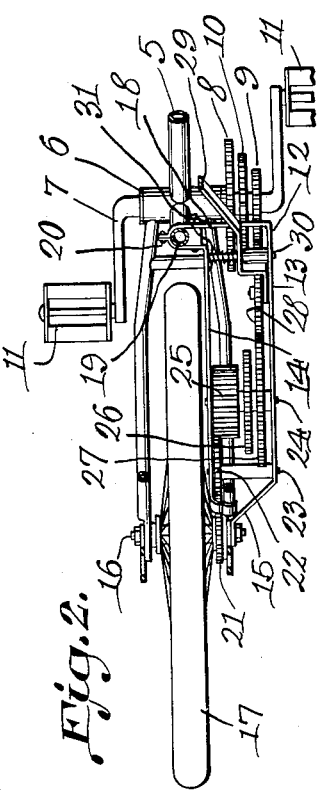
William E. Sperry, Inventor
By C. A. Snow & Co.
Attorneys.

Patented Dec. 5, 1933

1,938,157

UNITED STATES PATENT OFFICE 1,938,157

BICYCLE TRANSMISSION

William Elmer Sperry, San Diego, Calif.

Application July 14, 1932. Serial No. 622,532

2 Claims. (Cl. 208—154)

This invention relates to a transmission mechanism designed primarily for use in connection with bicycles, the primary object of the invention being to provide a transmission mechanism whereby power may be transmitted from the usual pedal shaft, to the rear or drive wheel of the bicycle at various speeds, to permit the bicycle to be operated with facility.

An important object of the invention is to provide a device of this character including a frame so constructed that it may be readily and easily positioned on the usual bicycle frame, eliminating the necessity of making extensive alterations in the bicycle construction, to mount the device.

Another object of the invention is to provide a transmission including a movable gear and a lever for operating the movable gear, the lever extending to a point adjacent to the operator's seat, where the operator may have easy access thereto.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is an elevational view of a bicycle equipped with a transmission constructed in accordance with the present invention.

Figure 2 is a plan view of the transmission.

Figure 3 is a fragmental plan view illustrating the means for locking the control lever of the adjustable gear.

Referring to the drawing in detail, the frame of the bicycle is indicated generally by the reference character 5, and embodies the usual bearing 6 in which the pedal crank shaft 7 operates.

The pedal crank shaft is substantially long, and supports a large gear 8, a small gear 9 and an intermediate gear 10, which are keyed thereto, to rotate with the crank shaft 7, when the pedals 11 are operated in the usual way.

The transmission mechanism forming the essence of the invention, is in the form of an attachment, and comprises a frame 12 that embodies spaced bars 13 and 14 respectively, the bar 13 having an inwardly extended end portion 15 formed with an opening to receive the axle 16, on which the rear wheel 17 of the bicycle is mounted.

The rear end of the bar 14 is bent around one of the bars of the rear fork of the bicycle frame, securing the bar to the bicycle frame.

As clearly shown by Figure 2 of the drawing, the bar 13 extends inwardly as at 18, where it is formed with a curved portion conforming to the shape of the bar 19 of the bicycle frame.

The bar 14 also has its forward end extended inwardly and curved around the bar 19, the forward extremities of the bars 13 and 14 being secured to the bar 19, at 20.

The reference character 21 designates a gear positioned on the axle 16, in lieu of the usual rear sprocket, and is in mesh with the teeth of the gear 22 mounted on the shaft 23 that in turn is carried by the auxiliary spring.

The shaft 24 is also mounted between the bars 13 and 14 of the auxiliary frame, and provides a support for the wide gear 25, gear 26 and gear 27, the gear 26 being of the same diameter as the gear 10, while the gear 27 is of the same diameter as the gear 8, the arrangement of gears being such that when the movable gear 28 is moved into mesh with aligning gears of adjacent shafts, the speed of rotation of the gears that transmits the movement to the rear wheel of the bicycle, may be varied.

The gear 28 is carried at the lower end of the lever 29, and is mounted on the shaft 30, that in turn is supported on the auxiliary frame, the shaft 30 being substantially long, so that the lever 29 may slide longitudinally thereof, to bring the gear 28, supported thereby into mesh with certain of the gears of the pedal crank shaft, and shaft 24.

Positioned on the shaft 30 is a coiled spring 31 which bears against the lever 29 and acts to urge the lever laterally.

In order that the lever 29 will be secured in its positions of adjustment, a keeper plate 32 is provided and secured adjacent to the horizontal bar of the bicycle frame, the keeper plate 32 being provided with offsets, to accommodate the lever 29, so that when the lever has been moved to adjust the transmission, the lever may be moved into one of the notches of the keeper plate, and held in position until removed by the operator.

I claim:

1. The combination with the rear wheel and sprocket of a bicycle and multiple gears of various sizes, mounted on the pedal shaft thereof, of a transmission mechanism embodying an auxiliary frame secured to the bicycle frame, multiple gears of various diameters mounted on the frame, a lever slidably mounted on the frame and carrying a gear and adapted to mesh with the gears of the pedal shaft and multiple gears mounted on the frame for transmitting movement of the pedal shaft to the multiple gears mounted on the auxiliary frame, and a gear meshing with the sprocket and multiple gears of the auxiliary frame for transmitting movement to the sprocket and rear wheel.

2. The combination with the rear sprocket wheel and rear wheel of a bicycle, and multiple gears on the pedal shaft thereof, of a transmission device comprising an auxiliary frame, a shaft mounted on the auxiliary frame, a plurality of gears of various sizes secured to the shaft to rotate therewith, a gear disposed between one of the last mentioned gears and rear sprocket to transmit movement of the shaft to the sprocket, a shaft supported by the frame, an operating lever slidably mounted on the last mentioned shaft, a spring on the last mentioned shaft normally urging the lever in one direction, means for holding the lever in its adjusted positions, and a gear mounted on the lower end of the lever and meshing with the gears of the pedal shaft and multiple gears of the auxiliary frame, for transmitting movement of the pedal shaft to the gears of the auxiliary frame.

WILLIAM ELMER SPERRY.